United States Patent [19]
Misawa

[11] Patent Number: 5,797,606
[45] Date of Patent: Aug. 25, 1998

[54] TRANSPORTER FOR PATIENT'S EMERGENCY ESCAPE

[75] Inventor: Rintaro Misawa, Saitama-ken, Japan

[73] Assignee: Sunwa Ltd., Tokyo, Japan

[21] Appl. No.: 741,978

[22] Filed: Oct. 31, 1996

[51] Int. Cl.$^6$ .................................................. B62B 9/02
[52] U.S. Cl. ............................ 280/5.22; 280/DIG. 10
[58] Field of Search ............................ 280/5.2, 5.22, 280/DIG. 10; 180/9, 9.1, 9.22, 9.32, 9.52

[56] References Cited

U.S. PATENT DOCUMENTS

| | | | |
|---|---|---|---|
| 1,911,924 | 5/1933 | Powers | 280/5.22 |
| 4,432,426 | 2/1984 | Misawa | 180/8.2 |
| 4,566,550 | 1/1986 | Misawa | 180/8.2 |
| 4,585,241 | 4/1986 | Misawa et al. | 280/5.22 |
| 4,688,813 | 8/1987 | Misawa et al. | 280/5.22 |
| 4,771,839 | 9/1988 | Misawa | 180/8.2 |
| 5,197,558 | 3/1993 | Misawa | 180/8.2 |
| 5,641,030 | 6/1997 | Toselli | 180/9.32 |

*Primary Examiner*—Kevin Hurley
*Attorney, Agent, or Firm*—Nikaido, Marmelstein, Murray & Oram LLP

[57] ABSTRACT

There is provided a transporter for patient's emergency escape, comprising: a transporter main body including a main body frame structure; a pair of crawler devices disposed on opposite sides of the transporter main body, each crawler device having a ground contacting surface extending for at least two steps of a stairway; a load-carrying frame structure provided above the transporter main body, said load-carrying frame structure being adapted to serve as a chair for carrying a person; a pair of tandem wheel structures each having a pair of ground contacting wheels arranged in the longitudinal direction of the transporter main body, said pair of tandem wheel structures being provided on opposite sides of the transporter main body near the rear ends of the crawler devices; a single tandem wheel structure having a pair of ground contacting wheels arranged in the longitudinal direction of the transporter main body, said single tandem wheel structure bing provided on the bottom of the transporter main body at a substantially central position thereof; a stand structure provided on the rear end of the transporter main body.

19 Claims, 12 Drawing Sheets

TRANSPORTER FOR PATIENT'S EMERGENCY ESCAPE

BACKGROUND OF THE INVENTION

The present invention relates to a transporter, in particular to a transporter for moving a patient from a danger zone to a safe area during an emergency escape such as an escape from a fire.

A modern hospital building having a large number of sickrooms is usually equipped with both elevators and stairways. A patient unable to walk may be put on a wheelchair, a stretcher or a movable bed, all of which can be moved into an elevator so as to go up or down within the hospital building.

However, if there is an emergency such as a fire, since elevators can not be used, patients who have been hospitalized and unable to walk themselves will have to be moved from a dangerous place to a safe area using stairways. But, since a modern hospital building usually has a large number of sickrooms and hence has a great number of patients who have to be moved downstairs as quickly as possible, it is necessary to prepare a considerable number of transporters which can be used to quickly and safely move patients downstairs and out of the hospital building.

In order to meet the above requirements, the applicant of the present application has already suggested a transporter for patient's emergency escape, as shown in FIG. 12 which was disclosed in Japanese Patent Publication No. 3-7551.

As shown in FIG. 12, the conventional transporter for patient's emergency escape previously proposed by the applicant, includes: a main body a, a pair of crawler devices b, b provided on opposite sides of the main body a, a load-carrying frame structure c pivotable above the main body a and having a projection f serving as a seat. Further, a pair of tandem wheel structures d, d are provided on opposite sides of the main body a near middle portions of the crawler devices b, b. Moreover, another pair of tandem wheel structures e, e are similarly provided on opposite sides of the main body a near rear ends of the crawler devices b, b.

Each of the tandem wheel structures d, d and e, e has a pair of ground contacting wheels rotatably supported on a supporting plate in a manner such that these wheels partially project downwardly beyond the ground contacting surfaces of the crawler devices b, b to contact the ground and thus can run on the ground with the crawler devices b, b being raised up from the ground surface to some extent. Since each supporting plate is pivotally supported at the middle position thereof on a supporting shaft, each pair of the ground contacting wheels can be alternatively raised up or lowered down.

When the transporter shown in FIG. 12 is going down a stairway, the crawler devices b, b will get in touch with steps of the stairway, and each pair of the ground contacting wheels will be alternatively raised up or lowered down (i.e., alternatively contacting steps of a stairway). On the other hand, when the transporter is moving on, a horizontal ground surface, all the wheels will be in contact with the ground, with the crawler devices b, b being raised up from the ground surface to some extent.

However, since the ground contacting wheels of the tandem wheel structures d, d and e, e are all comparatively small, it is difficult for the transporter to pass over an upwardly projecting things (such as a doorsill) formed on the ground surface.

Further, since all the ground contacting wheels of the tandem wheel structures d, d and e, e are always in a rotatable condition when they are in contact with a horizontal ground surface, a patient has to get on or off the transporter in an unstable and unbalanced condition (an undesired movement of the transporter).

Moreover, when the transporter shown in FIG. 12 is operated to go down a stairway with a patient sitting thereon, it is quite possible that the transporter will move in a increasingly fast speed, causing a danger to the patient.

In addition, even if a brake means is provided to the crawler devices b, b in order to control the downward movement of the transporter, it is necessary to properly adjust the brake means while the transporter is moving downstairs in order that the transporter may move down in a desired manner. However, this kind of adjustment has been proved difficult.

SUMMARY OF THE INVENTION

The object of the present invention is to provide an improved transporter for patient's emergency escape, so as to eliminate the above-mentioned problems peculiar to the above-mentioned prior art.

According to a first aspect of the present invention, there is provided an improved transporter for patient's emergency escape, comprising: a transporter main body including a main body frame structure; a pair of crawler devices disposed on opposite sides of the transporter main body, each crawler device having a ground contacting surface extending for at least two steps of a stairway; a load-carrying frame structure provided above the transporter main body, said load-carrying frame structure being adapted to serve as a chair for carrying a person; a pair of tandem wheel structures each having a pair of ground contacting wheels arranged in the longitudinal direction of the transporter main body, said pair of tandem wheel structures being provided on opposite sides of the transporter main body near the rear ends of the crawler devices; a single tandem wheel structure having a pair of ground contacting wheels arranged in the longitudinal direction of the transporter main body, said single tandem wheel structure bing provided on the bottom of the transporter main body at a substantially central position thereof; a stand structure provided on the rear end of the transporter main body, said stand structure being pivotable such that when the stand structure is in its vertical position the transporter main body will be slightly raised up causing all the ground contacting wheels to be raised up from ground surface, and when the stand structure is in its inclined position all the ground contacting wheels may become in contact with ground surface so that the transporter itself may begin to move. Here, the stand structure is formed as having an L-shape in its cross section.

Each of the pair of tandem wheel structures is constructed such that the two ground contacting wheels are rotatably supported on opposite ends of a supporting plate which itself is pivotally supported at the middle portion thereof on a frame member of the transporter main body.

Further, each of the pair of tandem wheel structures is installed such that the two ground contacting wheels may project downwardly beyond the ground contacting surface of each crawler device and are able to be alternatively raised up and lowered down.

The single tandem wheel structure is constructed such that the two ground contacting wheels are rotatably supported on two supporting members pivotable in the longitudinal direction of the transporter main body.

Further, the single tandem wheel structures is installed such that the two ground contacting wheels may project downwardly beyond the ground contacting surface of each crawler device and are able to be alternatively raised up and lowered down.

In detail, said single tandem wheel structure is disposed between the two crawler devices near the gravity center of the transporter.

Moreover, one of the crawler devices is further provided with a braking system adapted to effect a braking action on the crawler device by not gripping a brake lever and to release the braking action by gripping the brake lever.

In addition, an oil damper is provided close to the front end of the transporter main body to control undesirably accelerated transporter moving downstairs, thereby preventing too fast and dangerous downward movement of the transporter when being used in an emergency escape.

The above said oil damper includes a cylindrical main body and an extending/retracting rod receivable into the cylindrical main body, with the cylindrical main body pivotally mounted at an end thereof on the transporter main body, and with the front end of the extending/retracting rod operatively connected with a pair of shafts supporting a pair of crawler wheels of the two crawler devices.

According to a second aspect of the present invention, there is provided another improved transporter for patient's emergency escape, comprising: a transporter main body including a main body frame structure; a pair of crawler devices disposed on opposite sides of the transporter main body, each crawler device having a ground contacting surface extending for at least two steps of a stairway; a load-carrying frame structure provided above the transporter main body, said load-carrying frame structure being adapted to serve as a chair for carrying a person; a pair of tandem wheel structures each having a large front wheel and a small rear wheel arranged in the longitudinal direction of the transporter main body, said pair of tandem wheel structures being provided on opposite sides of the transporter main body near the rear ends of the crawler devices. Here, the pair of tandem wheel structures are constructed such that the large front wheel and the small rear wheel may be alternatively raised up or lowered down when the transporter is moving down a stairway, whilst the large front wheel and the small rear wheel will get in touch with ground surface when the transporter is moving on a horizontal ground surface.

The transporter according to the second aspect of the present invention also includes a stand structure provided on the rear end of the transporter main body, said stand structure being pivotable such that when the stand structure is in its vertical position the transporter main body will be slightly raised up causing all the large front wheels and small rear wheels to be raised up from ground surface, and when the stand structure is in its inclined position all the large front wheels and small rear wheels may become in contact with ground surface so that the transporter itself may begin to move. Here, the stand structure is formed as having an L-shape in its cross section.

Each of the pair of tandem wheel structures is constructed such that the large front wheel and the small rear wheel are rotatably supported on opposite ends of a supporting plate which itself is pivotally supported at the middle portion thereof on a frame member of the transporter main body.

Further, each of the pair of tandem wheel structures is installed such that the large front wheel and the small rear wheel may project downwardly beyond the ground contacting surface of each crawler device and are able to be alternatively raised up and lowered down.

Preferably, the large front wheel has a diameter which is 1.2-1.5 times as large as that of the small rear wheel.

Similar to the transporter according to the first aspect of the present invention, one of the crawler devices is further provided with a braking system adapted to effect a braking action on the crawler device by not gripping a brake lever and to release the braking action by gripping the brake lever.

Also, similar to the transporter according to the first aspect of the present invention, an oil damper is provided close to the front end of the transporter main body to control undesirably accelerated transporter moving downstairs, thereby preventing too fast and dangerous downward movement of the transporter when being used in an emergency escape.

The above said oil damper also includes a cylindrical main body and an extending/retracting rod receivable into the main body, with the cylindrical main body pivotally mounted at an end thereof on the transporter main body, and with the front end of the extending/retracting rod operatively connected with a pair of shafts supporting a pair of crawler wheels of the two crawler devices.

The above objects and features of the present invention will become more understood from the following description with reference to the accompanying drawings.

DETAILED DESCRIPTION OF THE PREFERRED EMBODIMENTS

Figure 1:
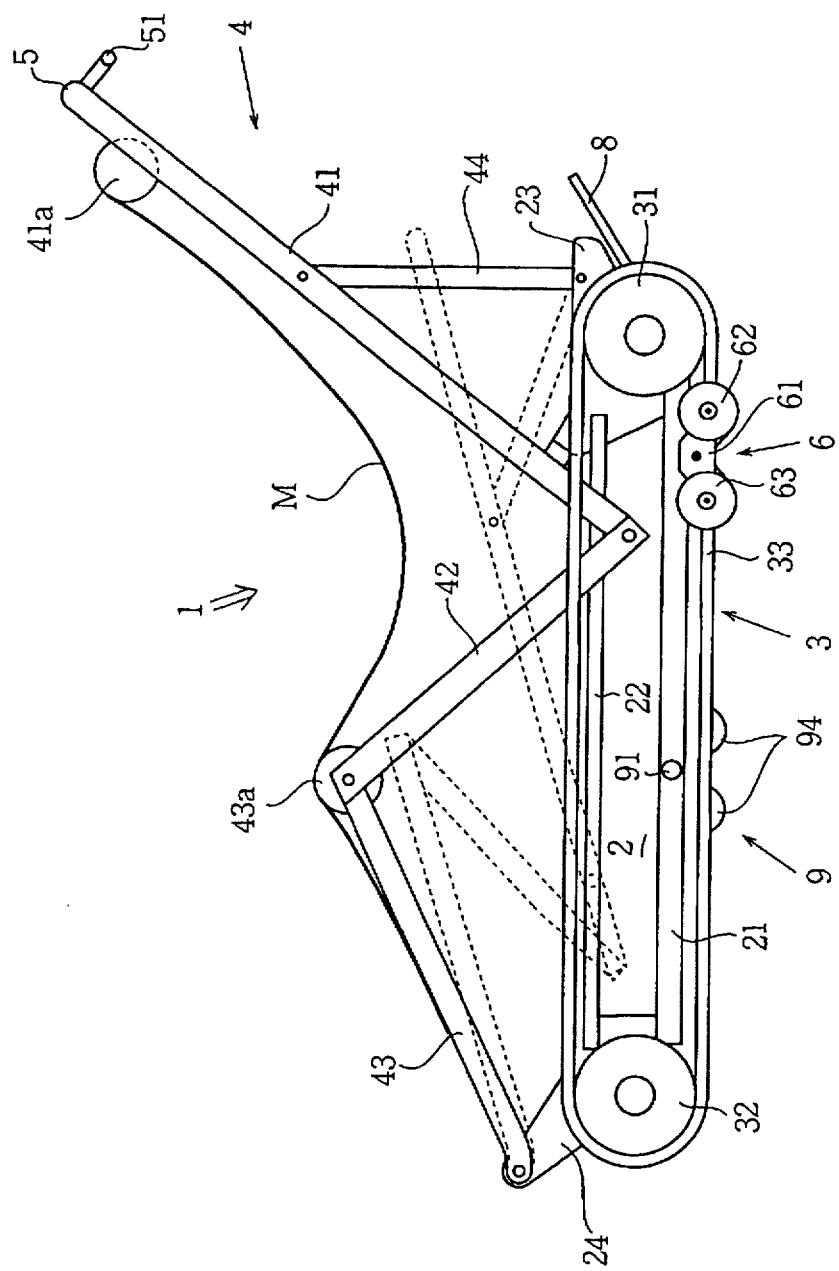
FIG. 1 is a side view showing a transporter for patient's emergency escape according to one embodiment of the present invention.
Figure 2:
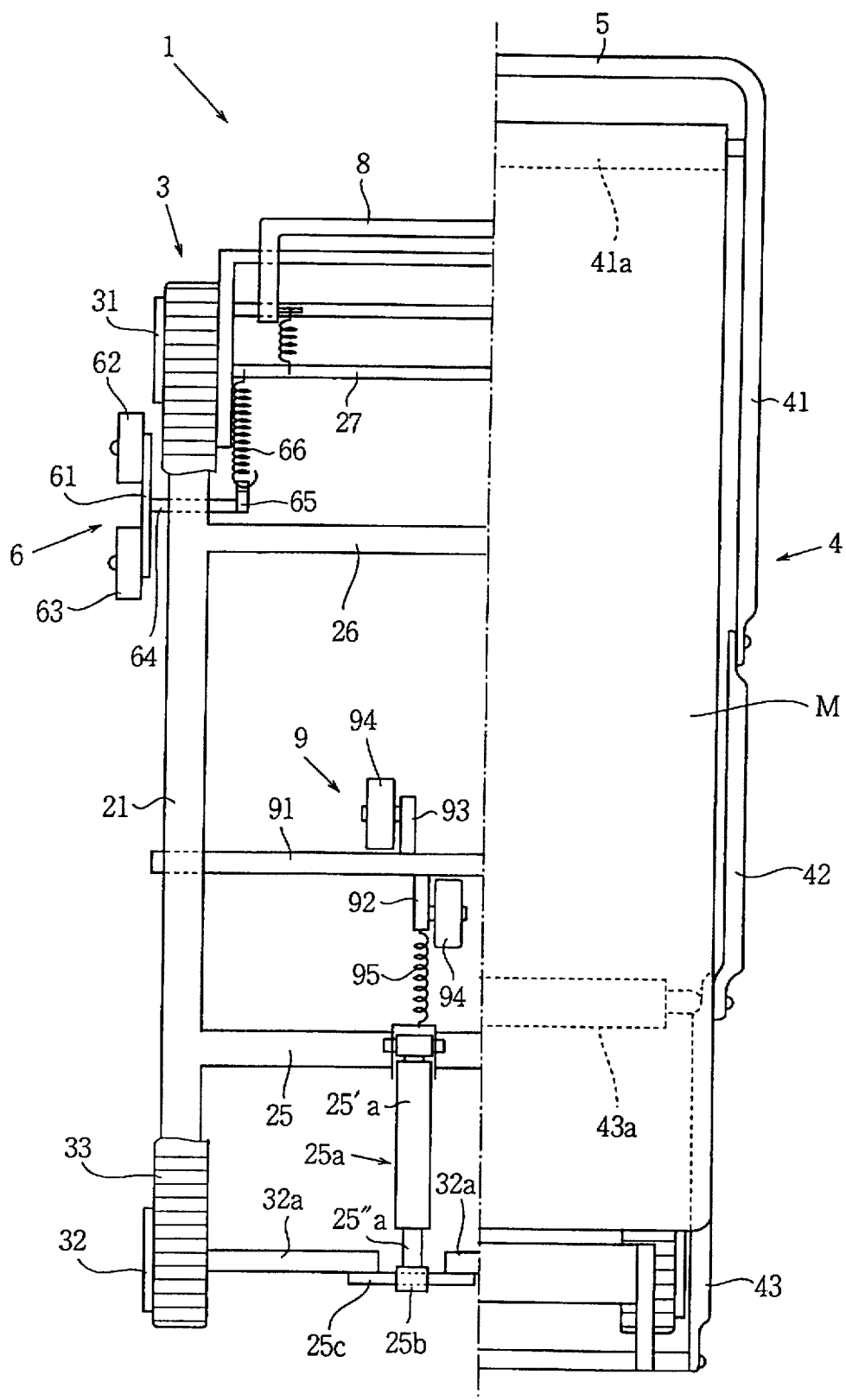
FIG. 2 is a top plane view of the transporter shown in FIG. 1.

Referring to FIGS. 1 and 2, reference numeral 1 represents a transporter for patient's emergency escape according to one embodiment of the present invention. As shown in the drawings, the transporter 1 comprises a transporter main body including a main body frame structure 2, a pair of crawler devices 3, 3 provided on opposite sides of the transporter main body, a load-carrying frame structure 4 provided above the main body frame structure 2 and adapted to serve as a chair for a patient. An operating handle 5 is integrally formed with the load-carrying frame structure 4 in a manner such that the handle 5 is positioned on the upper rear side of the frame structure 4.

As illustrated in FIG. 1, the main body frame structure 2 includes a pair of lower frame members 21, 21 arranged left and right on the bottom position thereof, a pair of upper frame members 22, 22 arranged left and right at an upper position thereof corresponding to the lower frame members 21, 21, a pair of rear frame members 23, 23 respectively secured left and right to the respective rear ends of the lower frame members 21, 21 and the upper frame members 22, 22, a pair of front frame members 24, 24 respectively secured left and right to the respective front ends of the lower frame members 21, 21 and the upper frame members 22, 22.

As illustrated in FIG. 2, in order to reinforce the main body frame structure 2, lateral frame members 25 and 26 are fixedly bridged between the two lower frame members 21, 21, another lateral frame member 27 is bridged between the two rear frame members 23, 23 so as to strengthen and firmly support the same.

The pair of crawler devices 3, 3 include a pair of rear wheels 31, 31 rotatably mounted on the pair of rear frame members 23, 23, a pair of front wheels 32, 32 rotatably mounted on the pair of front frame members 24, 24, a pair of endless belt crawlers 33, 33 arranged to pass around and engage with these front wheels 32, 32 and the rear wheels 33, 33. The belt crawlers 33, 33 are so provided that they each form a ground contacting surface extending for at least two steps when climbing up or down a stairway. Considering the stairway conditions, the belt crawlers 33, 33 are preferably made of an resilient synthetic rubber to absorb vibration as well as to protect the stairway steps. Further, each belt crawler 33 is provided on its outer surface with a lot of lugs (not shown) which are disposed at a predetermined interval to properly engage with steps of a stairway. Also, the inner surface of each belt crawler 33 is provided with a lot of lugs (not shown) to effectively engage with the teeth formed on the outer periphery surfaces of the front wheels 32, 32 and the rear wheels 31, 31. The crawler devices 3, 3 constructed in the above manner, are further equipped with a driving motor, reduction gear means and a battery means, so that the front wheels 32, 32 or the rear wheels 31, 31 may be driven, thereby enabling the transporter 1 to climb down a stairway.

Referring again to FIG. 2, the front wheels 32,32 are fixedly mounted on a pair of shafts 32a, 32a. Further, an oil damper 26a is provided so as to be pivotally mounted at an end thereof on the lateral frame 25. The oil damper 25a includes a cylindrical main body 25a' and an extending/retracting rod 25a" receivable into the main body 25a'. The front end of the rod 25a" is integrally formed with a support member 25b. A connecting rod 25c is pivotally supported through the support member 25b and is fixed at both ends thereof with the two shafts 32a, 32a.

Figure 3:
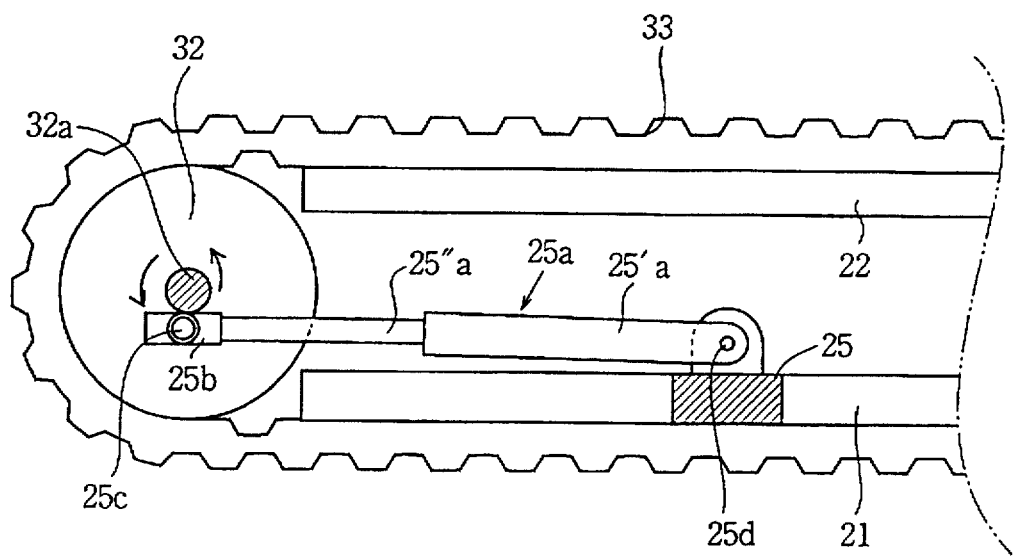
FIGS. 3a and 3b are schematic explanatory views showing the operation of an oil damper provided to control the downward movement of the transporter shown in FIG. 1.
Figure 3:
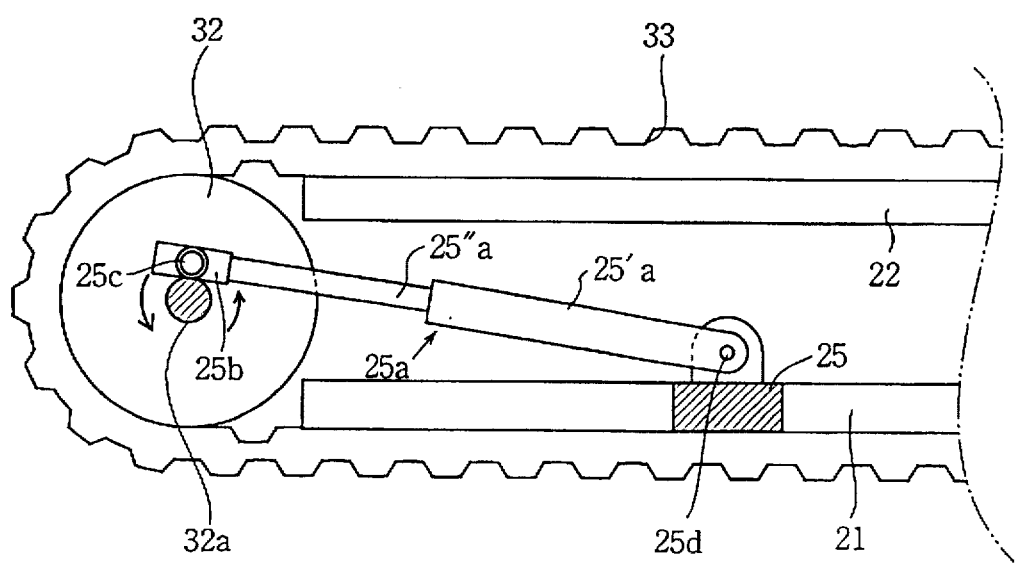

Referring to FIG. 2 and FIGS. 3a and 3b, when the front wheels 32, 32 rotate, the shafts 32a, 32a will also rotate at the same time, thus the connecting rod 25c fixed at both ends thereof with the two shafts 32a, 32a will revolve around the shafts 32a, 32a. In this way, the extending/retracting rod 25a" will be pulled forwardly and pushed rearwardly, causing the cylindrical main body 25a' to pivot up and down about a pivoting point 25d. In other wards, the rotating movement of the shafts 32a, 32a may be converted into the extending/retracting movement of the rod 25a".

With the use of the oil damper 25a, if the rotation of the front wheels 32, 32 are undesirably accelerated when the transporter 1 moves down a stairway, the rotating speed of the wheels 32, 32 may be controlled, thus preventing too fast and dangerous downward movement of the transporter 1 when it is being used in an emergency escape.

Referring again to FIGS. 1 and 2, a pair of tandem wheel structures 6, 6 are provided on opposite sides of the main body frame structure 2 close to the rear ends of the crawler devices 3, 3 . Each tandem wheel structure 6 has a pair of ground contacting wheels 62,63 rotatably supported on a supporting plate 61 such that the wheels 62, 63 slightly project downwardly beyond the belt crawlers 33, 33 to contact the ground surface. Further, each supporting plate 61 is carried at the middle portion thereof on one end of a pivoting shaft 64 (FIG.2) which in turn is pivotally supported on a corresponding lower frame 21. The other end of the pivoting shaft 64 is provided with a connecting element 65 which in turn is connected with one end of a spring 66. The other end of the spring 66 is fixed on the lateral frame member 27.

When travelling on a horizontal ground surface, the wheels 62 and 63 of each tandem wheel structure 6 will project downwardly beyond each belt crawler 33. If any one of the wheels 62 and 63 is bumped by a force from below, the bumped wheel will move upwardly whereas the other wheel will move downwardly, due to a pivoting movement of the supporting plate 61 about the pivoting shaft 64, just like a seesaw.

Referring to FIG. 1 and particularly to FIG. 2, a single tandem wheel structure 9 is provided under main body structure 2 near the gravity center of the transporter 1.

As shown in FIG. 2, the single tandem wheel structure 9 comprises a pivoting shaft 91 pivotally supported on the lower frame members 21, 21, a first wheel supporting member 92 firmly secured on the pivoting shaft 91 and projecting forwardly from the shaft 91, a second wheel supporting member 93 secured on the pivoting shaft 91 and projecting rearwardly from the shaft 91, with the member 92 separated slightly from the member 93. Two ground contacting wheels 94, 94 are rotatably mounted on the members 92 and 93 respectively.

Referring again to FIG. 2, the first wheel supporting member 92 is connected through a spring 95 to the lateral frame member 25. With the urging force of the spring 95, the first and second wheel supporting members 92 and 93 will be maintained parallel to the belt crawlers 33, 33. In this manner, when travelling on a horizontal ground surface, the wheels 94, 94 will project downwardly beyond the belt crawlers 33, 33. If any one of the wheels 94, 94 is bumped by a force from below, the bumped wheel will move up whilst the other wheel will move down, due to an integral pivoting movement of the two wheel supporting members 92 and 93, caused by the pivoting movement of pivoting shaft 91, just like a seesaw.

As shown in FIGS. 1 and 2, the loading-carrying frame structure 4 of the transporter 1 includes a first pair of frame members 41, 41 for supporting the trunk portion of a patient's body, a second pair of frame members 42, 42 for supporting the waist part of a patient's body, a third pair of frame members 43, 43 for holding the patient's feet, with all the frame members being pivotable from the positions shown in dotted lines to the positions shown in solid lines in FIG. 1.

Further, the loading-carrying frame structure 4 is provided with a cloth material M stretching and extending over the entire length of the structure 4, so that a patient can easily sit on the transporter 1 without any uncomfortable feelings.

In detail, as shown in FIG. 1, the third pair of frame members 43, 43 are pivotally connected on the front frame members 24, 24, the other ends of the frame members 43, 43 are pivotally connected with the second pair of frame members 42, 42 by means of a resilient cylindrical member 43a, so that a patient would not feel uncomfortable when bending his legs around the member 43a. The other ends of the frame members 42, 42 are pivotally connected with the first pair of frame members 41, 41, the end portions of which together form a U-shape so as to serve as a handle 5. Further, a pair of support frame members 44 are provided, with upper ends thereof pivotally connected to the middle positions of the frame members 41, 41 and the lower ends thereof pivotally supported on the rear frame members 23, 23. Moreover, a resilient cylindrical material 41a is attached to the frame members 41, 41 in order that a patient would not have uncomfortable feelings when resting his head on it.

Figure 4:
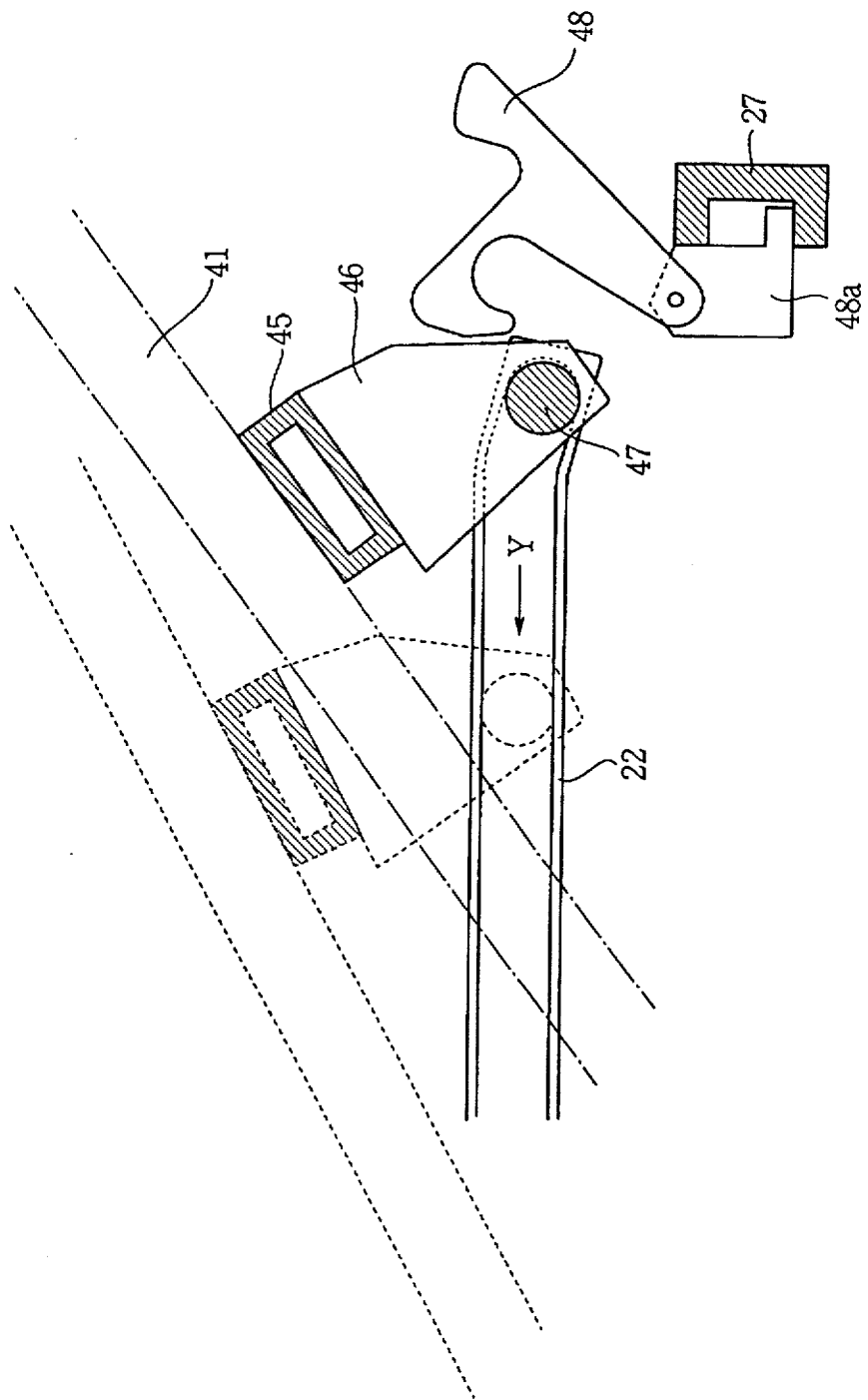
FIG. 4 is a schematic explanatory view showing an operation of a load-carrying frame structure of the transporter shown in FIG. 1.

Now, referring to FIG. 4, a support frame 45 is provided under and across the frame members 41, 41, a pair of bracket members 46, 46 are provided to support the support frame 45. In detail, the bracket members 46, 46 are connected with a sliding pipe 47 which is inserted through the upper frame members 22, 22 (each having a U-shaped recess portion so as to receive and hold a pipe member or the like). In this way, the sliding pipe 47 is slidable in a direction shown by an arrow Y in FIG. 3, along the upper frame members 22, 22 in the longitudinal direction thereof.

When the sliding pipe 47 is in the rear end positions of the upper frame member 22, 22, the load-carrying frame structure 4 will be in an upwardly stretched condition (as shown by the solid line in FIG. 1) that is easy for a patient to get on the transporter 1. Further, a hook member 48 is connected with a bracket 48a which is secured on the lateral frame member 27. With the use of the hook member 48, the sliding pipe 47 may be held at end positions of the upper frame members 22, 22.

On the other hand, when the sliding pipe 47 is caused to slid in a direction shown by an arrow Y in FIG. 4 along the upper frame members 22, 22 in the longitudinal direction thereof, the load-carrying frame structure 4 will change into a folded condition (as shown by the dotted lines in FIG. 1), so that it is easy to carry or put the transporter 1 away when not in use.

Figure 5:
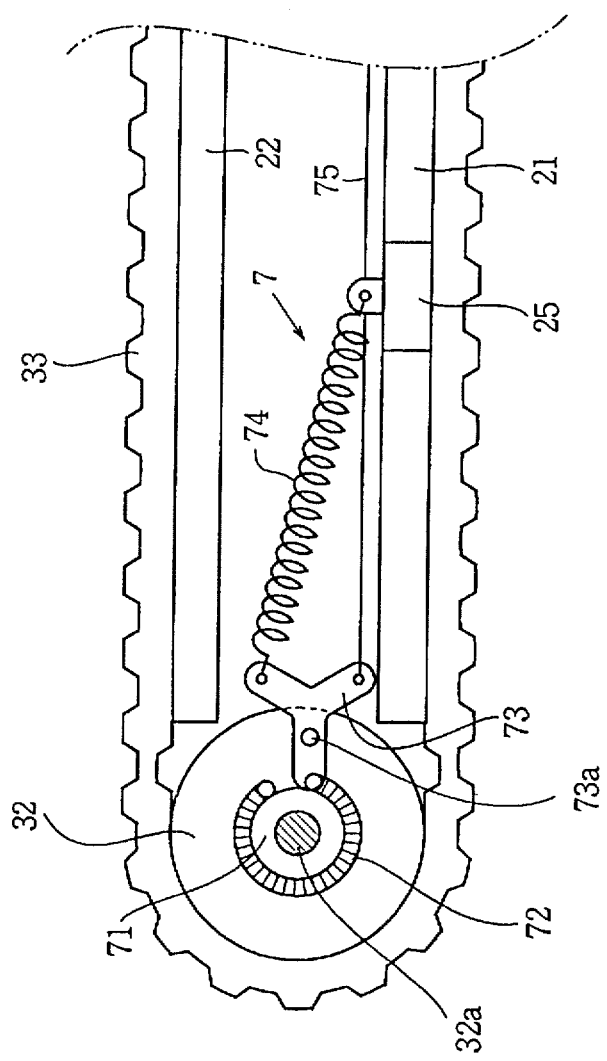
FIG. 5 is a schematic explanatory view showing a brake mechanism provided in the transporter shown in FIG. 1.

Referring to FIG. 5, the front wheel 33 of one crawler device 3 is provided with a brake mechanism 7 which is constructed in the following manner.

As shown in FIG. 5, a brake shoe 72 is provided to tightly engage around a drum 71 formed integrally with the shaft 32. In detail, one end of the brake shoe 72 is fixed on the drum 71 whilst the other end thereof is connected with a Y-shaped member 73. The Y-shaped member 73 is formed as having three protruding portions directing in three different directions, with a generally central point 73a thereof pivotally supported on the transporter main body. In this way, as shown in FIG. 5, a left protruding portion of the member 73 is connected with one end of the brake shoe 72, an upper right protruding portion of the member 73 is connected with one end of a spring 74, the lower right protruding portion of the member 73 is connected with a brake wire 75.

The other end of the spring 74 is connected with the lateral frame member 25, thus the brake shoe 72 is normally tightly engaged with the drum 71 so as to stop the front wheels 32, 32.

Further, the other end of the brake wire 75 is connected to a brake lever 51 provided on the handle 5. Upon gripping the brake lever 51, the brake wire 75 is pulled to the right in FIG. 5, so that the Y-shaped member 73 is caused to pivot a little in the counterclockwise direction, causing the brake shoe 72 to pivot in the same direction. Thus, the engagement between the brake shoe 72 and the drum 71 is released, enabling the front wheels 32, 32 to become free to run.

Figure 6:
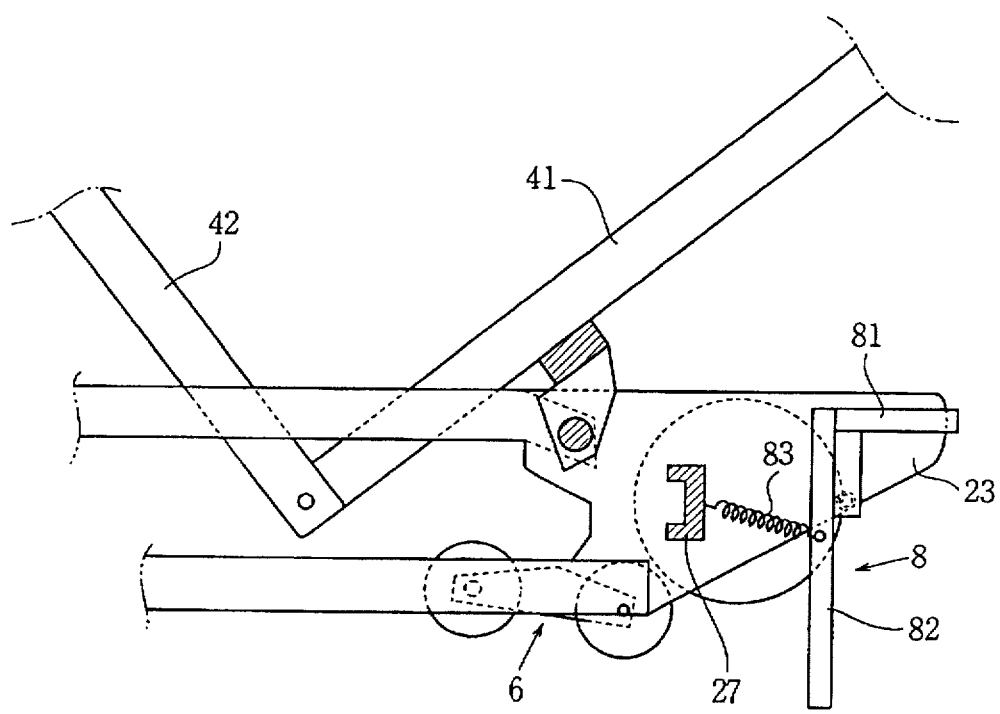
FIGS. 6a and 6b are schematic explanatory views showing the operation of a stand structure for use with the transporter shown in FIG. 1.
Figure 6:
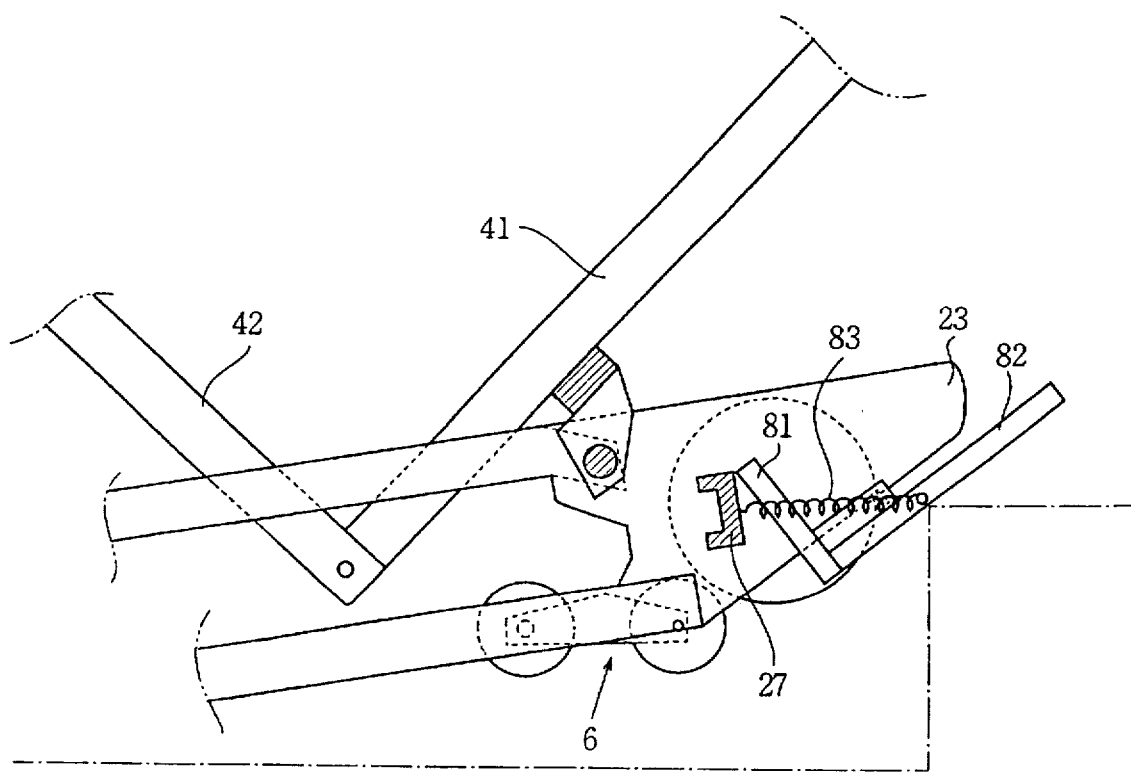

Now, referring to FIGS. 2 and 6, a stand structure 8 is provided on the rear side of the transporter 1. As shown in FIG. 6a, the stand structure 8 comprises a horizontal short member 81 and a vertical long member 82, forming an L-shape in its cross section. The vertical long member 82 is pivotally supported at its generally middle position on the rear side of the transporter 1, so that the stand structure 8 as a whole can freely pivotal from a position shown in FIG. 6a to a position shown in FIG. 6b. Further, a spring 83 is used to elastically connect the vertical member 82 with the lateral frame member 27, as shown in FIG. 6a.

Referring again to FIG. 6a, when a patient is to get on or off the transporter 1, the vertical member 82 of the stand structure 8 shall be operated to stand in its vertical position (shown in FIG. 6). Thus, the transporter 1 as a whole is raised up a little, causing the rising of the wheels 62, 63 of the tandem wheel structure 6, 6 and the wheels 94, 94 of the tandem wheel structure 9 (also shown in FIG. 7). As a result, the transporter 1 becomes into a completely stopped state by virtue of the stand structure 8 and the brake mechanism 7, thus a patient can get on or off the transporter 1 without any undesired movement thereof.

On the other hand, when the transporter 1 is travelling on a horizontal ground or moving down a stairway, the stand structure 8 shall be pivoted into a position shown in FIG. 6b. In this manner, the stand structure 8 will not hamper the horizontal movement or down-going movement of transporter 1. In addition, when the transporter 1 is moving from the last step of a stairway to a horizontal ground surface, the member 82 of the stand structure 8 in the position shown in FIG. 6 can also serve as a guide member for the transporter 1 to smoothly move over the corner of the last step.

The use and operation of the transporter 1 according to the above embodiment of the present invention will be described below with reference to FIGS. 7–9.

Figure 7:
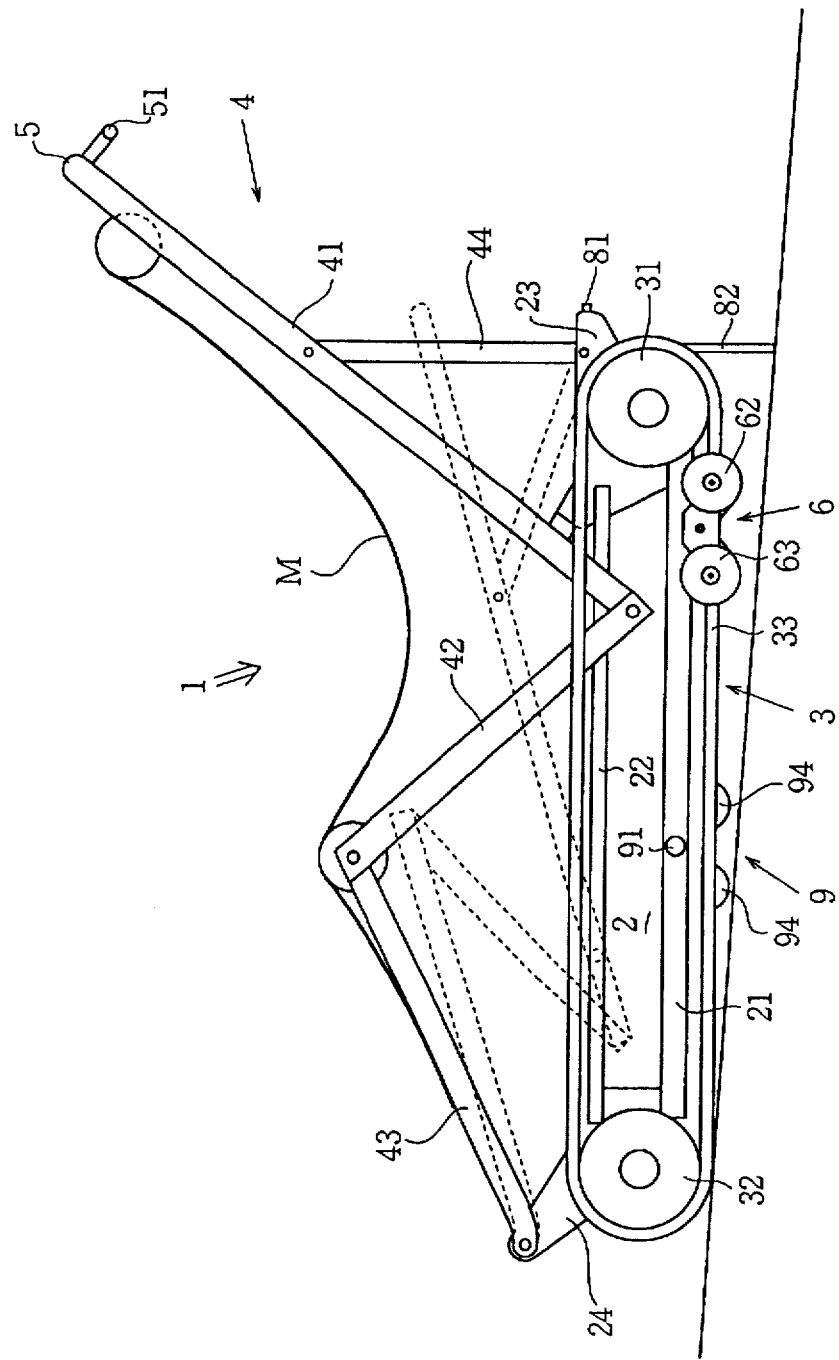
FIG. 7 is a side view showing the transporter of FIG. 1 in its stopped condition on a horizontal ground.

As shown in FIG. 7, when the transporter 1 is to be used to transport a patient, the stand structure 8 should be in a position shown in the drawing such that the vertical member 82 of the stand structure 8 is caused to stand in its vertical position. Thus, the transporter 1 is raised up a little at the rear side thereof, causing the rising (from the ground surface) of the wheels 62, 63 of the tandem wheel structures 6, 6 and the wheels 94, 94 of the single tandem wheel structure 9. As a result, the transporter 1 becomes into a completely stopped state by virtue of the stand structure 8 and the brake mechanism 7.

Then, the sliding pipe 47 is moved to the rear end positions of the upper frame members 22, 22 (as shown in FIG. 4), so that the load-carrying frame structure 4 is stretched upwardly into a position shown by solid lines in FIG. 7.

After a patient has got on the transporter 1, the stand structure 8 is operated to pivot in a counterclockwise direction, causing the member 82 to leave from the ground surface. In this manner, the wheels 62, 63 of the tandem wheel structures 6, 6 and the wheels 94, 94 of the tandem wheel structure 9 will get in contact with the ground surface, thereby enabling the transporter 1 to move on the horizontal ground surface.

Figure 8:
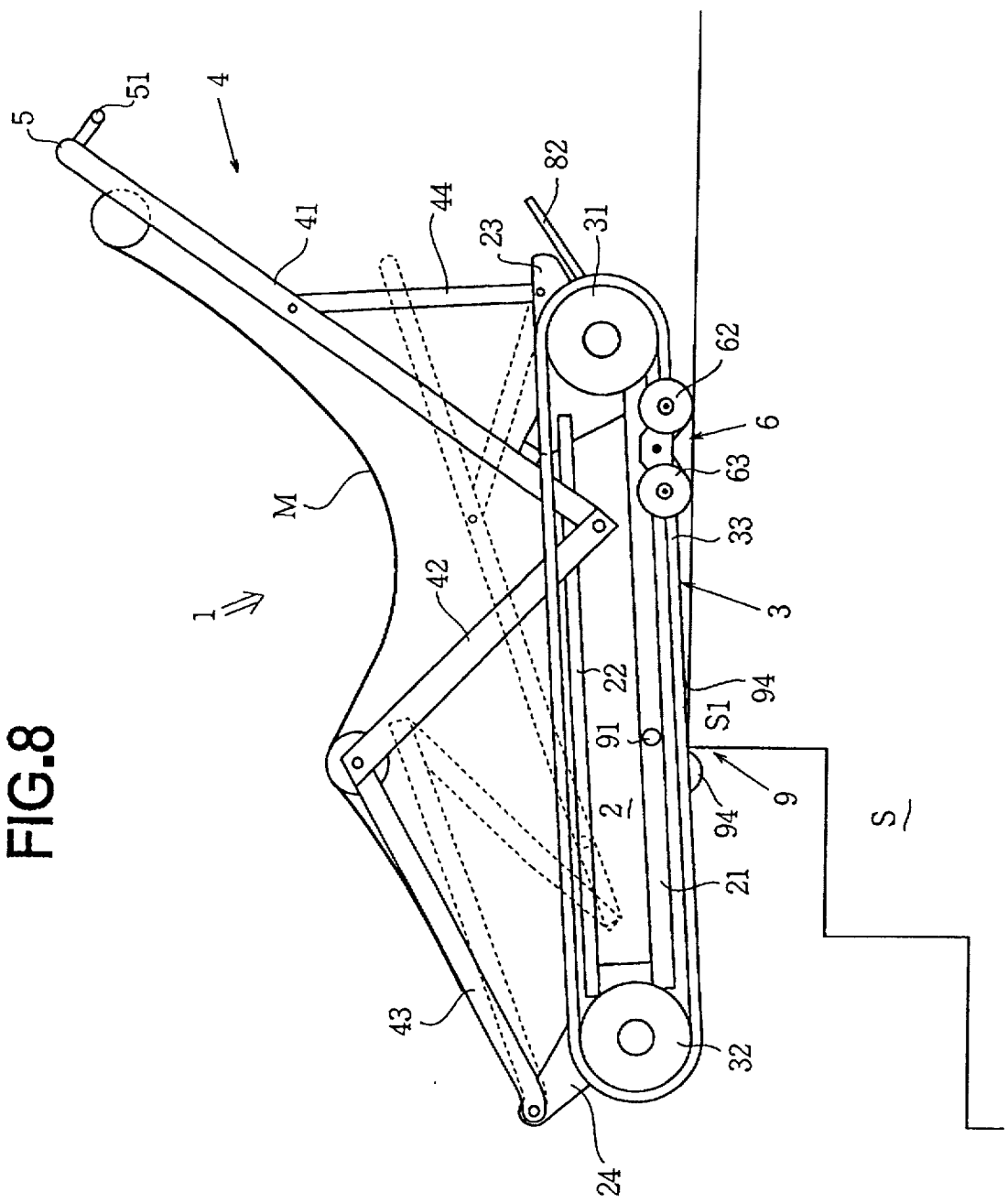
FIG. 8 is a schematic explanatory view showing a condition where the transporter shown in FIG. 1 is about to move down a stairway.

Subsequently as shown in FIG. 8, when the transporter 1 is about to move from a horizontal floor to a stairway and begin to climb down, at first the front portion of the transporter 1 is caused to move beyond the corner S1 of a first step, then the front wheel 94 of the tandem wheel structure 9 moves over the corner S1. With the pivoting movement of the tandem wheel structure 9, the belt crawlers 33, 33 (near the wheel 94) will get in contact with the corner S1, so that the transporter 1 will automatically stop for a while at a position shown in FIG. 7. Afterwards, the transporter 1 is changed from its horizontal position into its inclined position to start climbing down the stairway S. At this moment, since the single tandem wheel structure 9 is disposed close to the gravity center of the transporter 1, the transporter 1 as a whole will be in a well-balanced condition stable in its longitudinal direction.

Then, upon gripping the brake lever 51 provided on the handle 5, the braking action effecting on the front wheels 32, 32 may be released, so that the crawler devices 3, 3 are driven, causing the transporter 1 to climb down the stairway S.

Figure 9:
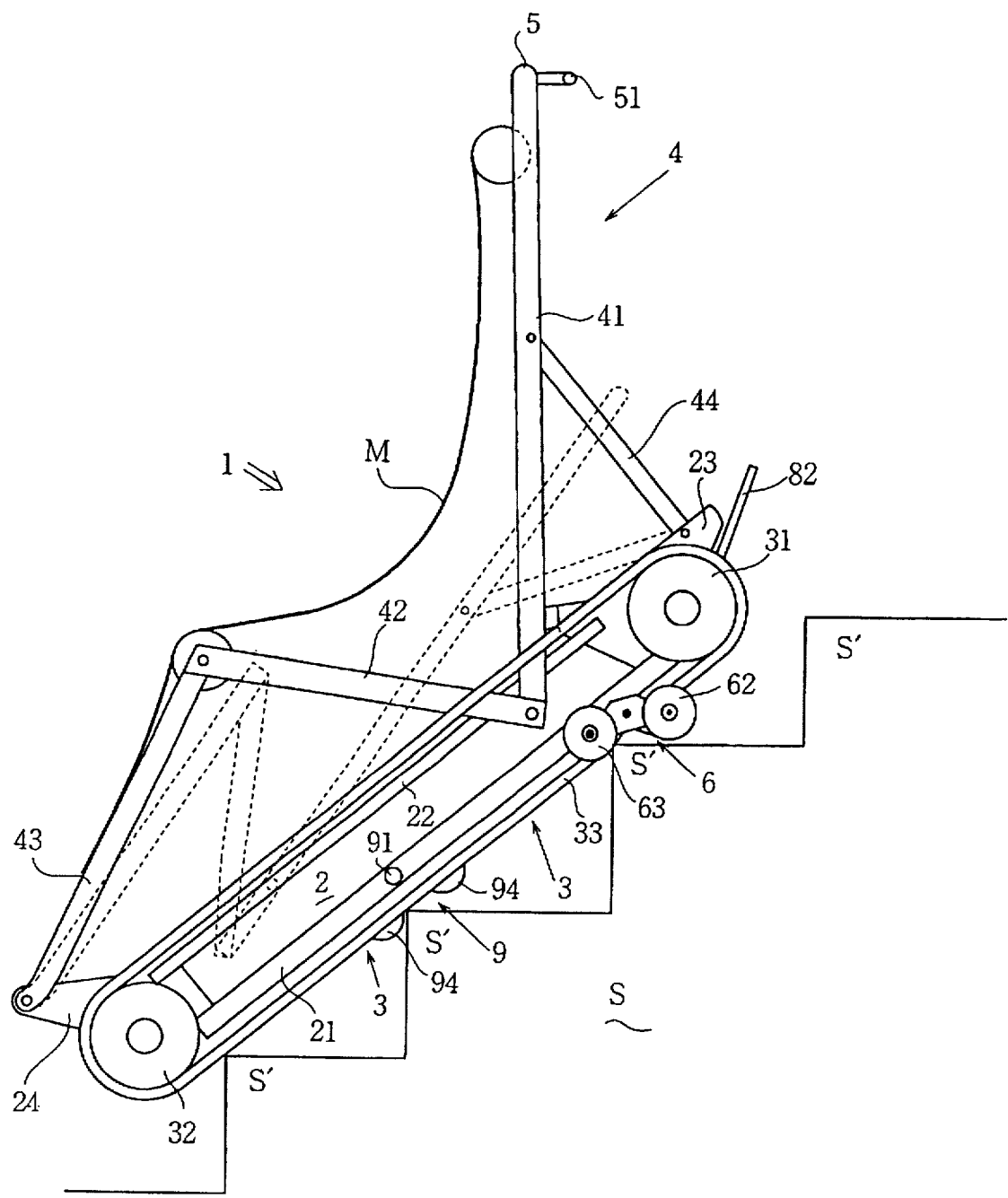
FIG. 9 is a schematic explanatory view showing a condition where he transporter shown in FIG. 1 is moving down a stairway.

Referring to FIG. 9, during the down-climbing movement of the transporter 1, when the front wheel 94 of the tandem wheel structure 9 and the front wheel 63, 63 of the tandem wheel structures 6, 6 will bump against corners S' of the stairway S, the respective front wheels 94 and 63 will be pushed upwardly by the respective corners S', whilst the rear wheel 94 of the tandem wheel structure 9 and the rear wheels 62, 62 of the tandem wheel structures 6, 6 will be lowered down due to a seesaw movement of these tandem wheel structures. In this way, with the front portions of the crawler devices 3, 3 being continuously contacted with steps of a stairway, the two wheels 94, 94 of the tandem wheel structure 9, similarly the two wheels 63, 62 of each tandem wheel structure 6, will be alternatively raised up or lowered down, without causing any trouble to down-climbing movement of the transporter 1.

Since, during the down-climbing movement of the transporter 1, the stand structure 8 is pivoted into a position shown in FIG. 9, the stand structure 8 will not hamper down-going movement of the transporter. In addition, when the transporter 1 is moving from the last step of a stairway to a horizontal ground surface, the member 82 of the stand structure 8 in the position shown in FIG. 9 can also serve as a guide member for the transporter 1 to smoothly move over the corner of a last step.

Figure 10:
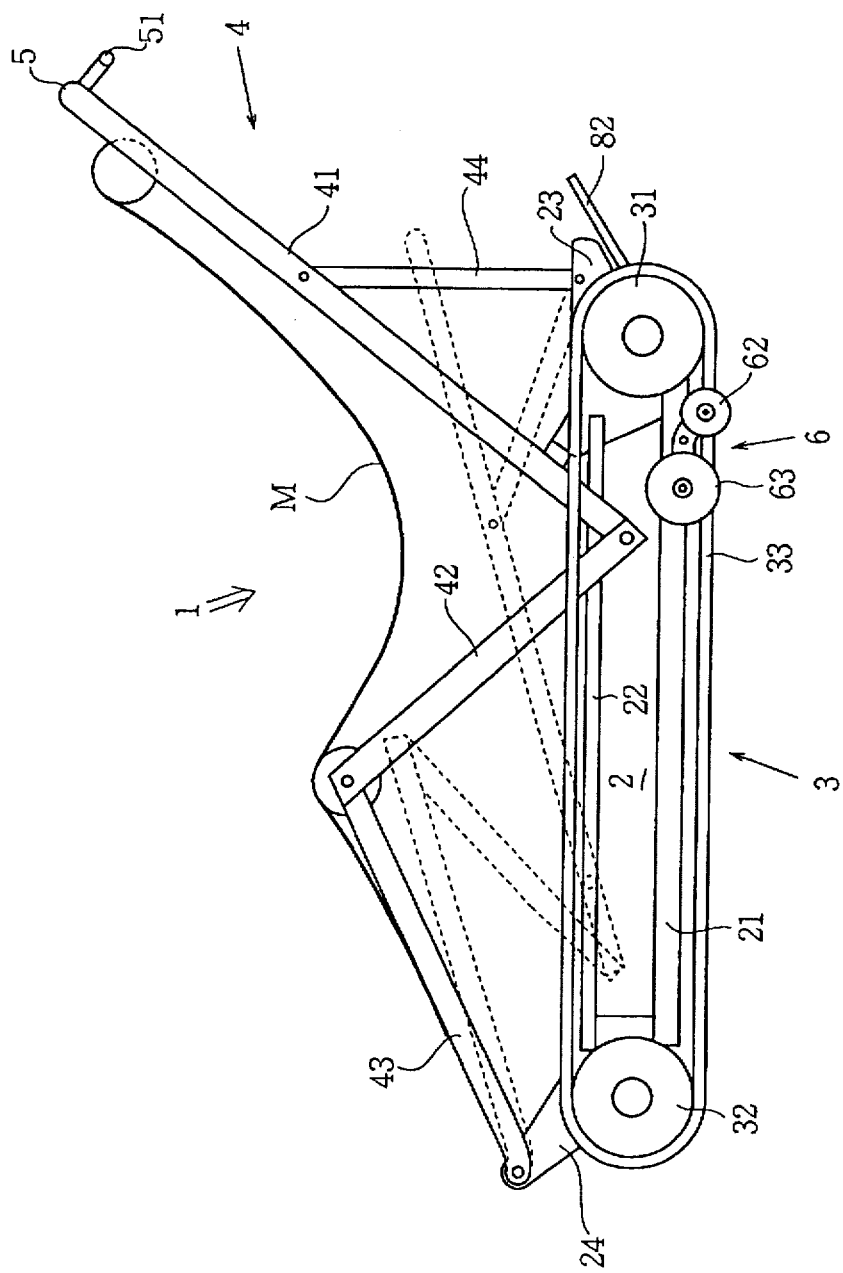
FIG. 10 is a side view showing a transporter for patient's emergency escape, according to another embodiment of the present invention.
Figure 11:
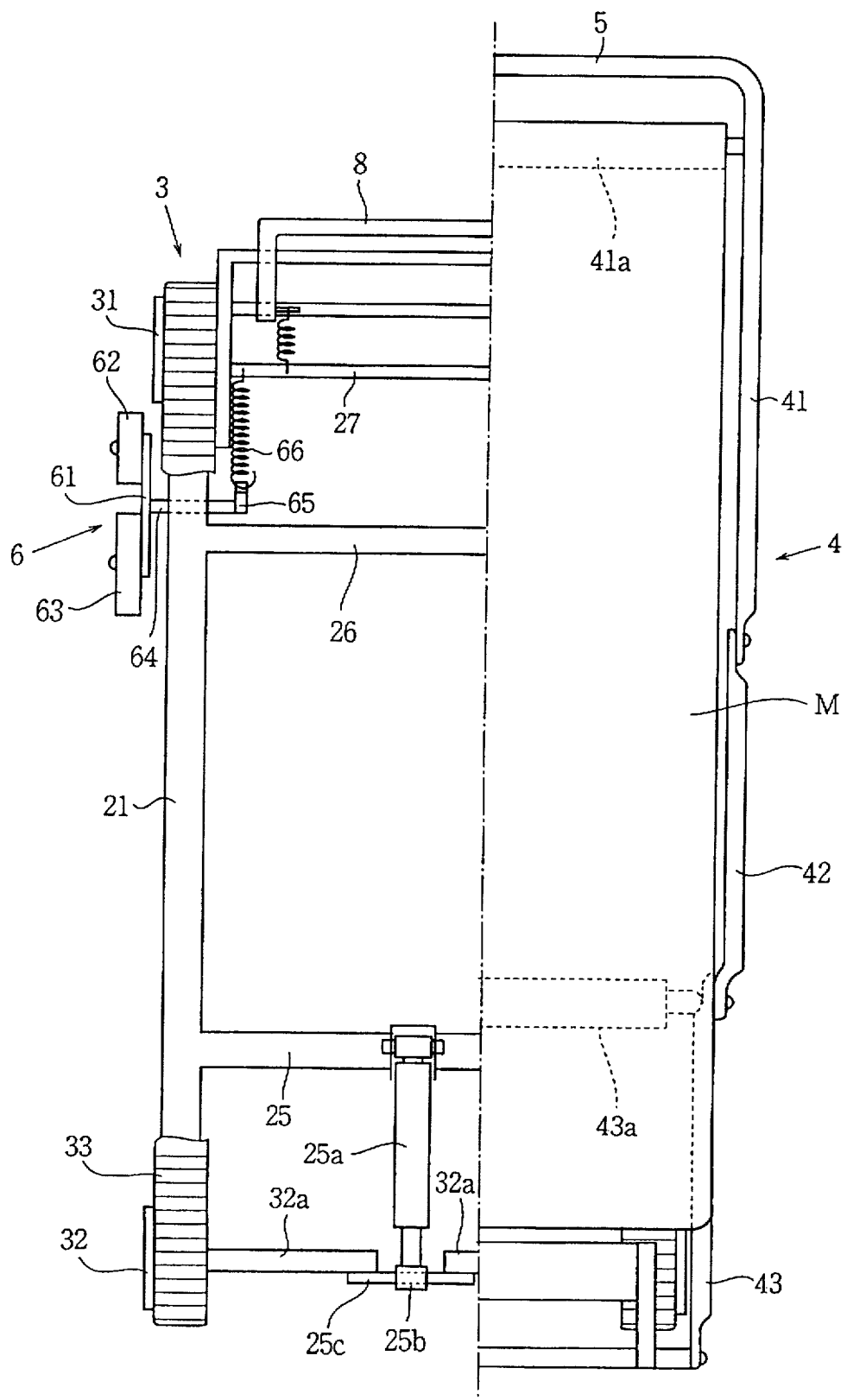
FIG. 11 is a top plane view of the transporter shown in FIG. 10.
Figure 12:
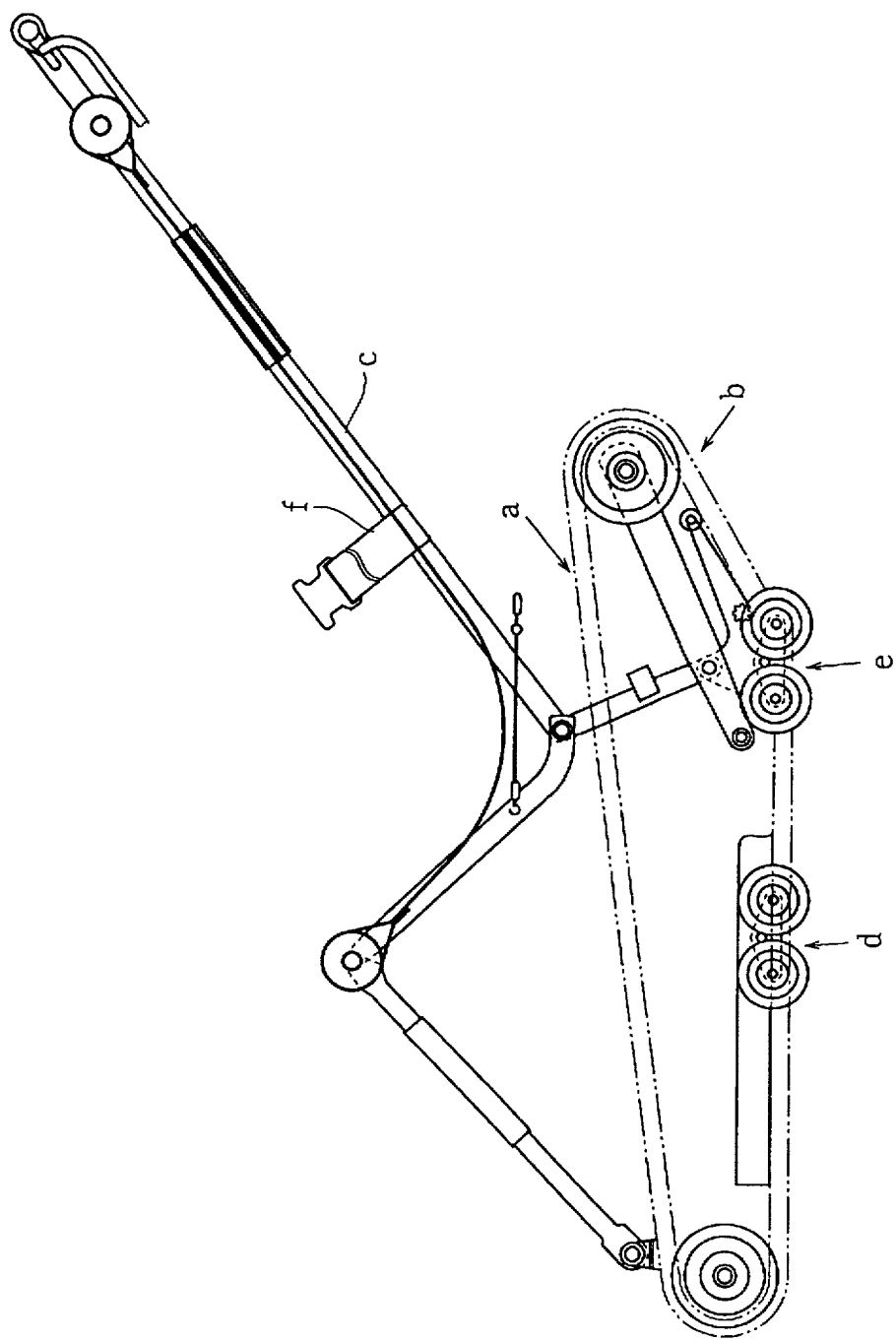
FIG. 12 a side view showing a conventional transporter for patient's emergency escape.

FIGS. 10 and 11 illustrate another improved transporter for patient's emergency escape, according to the second embodiment of the present invention.

As shown in FIGS. 10 and 11, a transporter 1 according to the second embodiment of the present invention is similar to the transporter of the above first embodiment, except that the single tandem wheel structure 9 has been omitted, and the pair of tandem wheel structures 6, 6 have been modified.

Similar to the transporter of the above first embodiment, a pair of tandem wheel structures 6, 6 are provided on opposite sides of the main body frame structure 2 close to the rear ends of the crawler devices 3, 3, in a manner such that all the wheels of the tandem wheel structures 6, 6 will project downwardly beyond the belt crawlers 33, 33 to contact the ground surface. Each tandem wheel structure 6 has a pair of wheels 62, 63 (the wheel 63 is larger than the wheel 62, preferably the diameter of the wheel 63 is 1.2–1.5 times as large as that of the wheel 62) rotatably supported on a supporting plate 61. Further, each supporting plate 61 is carried at the middle portion thereof on one end of a pivoting shaft 64 which in turn is pivotally supported on a corresponding lower frame 21. The other end of the pivoting shaft 64 is provided with a connecting element 65 which is connected with one end of a spring 66. The other end of the spring 66 is fixed on the lateral frame member 27.

When travelling on a horizontal ground surface, the wheels 62 and 63 of each tandem wheel structure 6 will project downwardly beyond the belt crawlers 33, 33 to contact the ground surface. If any one of the wheels 62 and 63 is bumped by a force from below, the bumped wheel will move upwardly whilst the other wheel will move downwardly, due to a pivoting movement of the supporting plate 61 about the pivoting shaft 64, just like a seesaw.

Referring again to FIGS. 10 and 11, since the front wheel 63 of the tandem wheel structure 6 is made comparatively larger than its rear wheel 62, it is easy for the transporter 1 to pass over a upwardly projecting portion (such as a doorsill) formed on the ground surface.

The use and operation of the transporter 1 according to the second embodiment of the present invention will be described below with reference to FIGS. 10–11.

At first, the front and rear wheels 63, 62 of the tandem wheel structures 6, 6 are made in contact with the ground surface. At this moment, since the brake mechanism 7 is having a braking effect on the front wheels 32, 32 of the crawler devices 3, 3 and since the front ends of the belt crawlers 33, 33 are in contact with the ground surface, the transporter 1 is in a stabilized stop condition.

Then, the sliding pipe 47 is moved to the rear end positions of the upper frame members 22, 22 (in the same manner as shown in FIG. 4), so that the load-carrying frame structure 4 is stretched upwardly into a position shown by solid lines in FIG. 10.

Afterwards, a patient can get on the transporter 1 without any unstable feelings possibly caused by an undesired movement of the transporter 1.

When the transporter 1 is caused to move on a horizontal ground surface, the front and rear wheels 63, 62 of the tandem wheel structures 6, 6 will be running in contact with the ground surface. At this time, the handle 5 would be pushed down to some extent in order that the front ends of the crawler devices 3, 3 will be pivoted upwardly to the same extent, with the wheels 63 and 62 acting as a pivoting fulcrum, thereby supporting the transporter 1 and enabling it to move by means of the two wheels 63 and 62.

When the transporter 1 is needed to move from a horizontal floor to a stairway and begin to climb downstairs, the braking effect of the brake mechanism 7 upon the front wheels 32, 32 is released by gripping the brake lever 51 provided on the handle 5, so that the crawler devices 3, 3 will change into a movable condition.

At first, the front portions of the crawler devices 3, 3 are caused to move beyond the corner of a first step, then the front wheel 63 of the tandem wheel structure 6 bumps against the corner of the first step, thus the front 63 will be pushed upwardly by the step corner, whilst the rear wheel 62 of the tandem wheel structure 6 will be lowered down due to a seesaw movement of the tandem wheel structure. In this way, with the front portions of the crawler devices 3, 3 being continuously contacted with steps of a stairway, the two wheels 63, 62 of the tandem wheel structures 6, 6 will be alternatively raised up or lowered down, without causing any trouble to down-climbing movement of the transporter 1.

When the transporter 1 is moving from the last step of a stairway to a horizontal ground surface, the member 82 of the stand structure 8 (in the same position as shown in FIG. 9) can also serve as a guide member for the transporter 1 to smoothly move over the corner of a last step.

While the presently preferred embodiments of the this invention have been shown and described above, it is to be understood that these disclosures are for the purpose of illustration and that various changes and modifications may be made without departing form the scope of the invention as set forth in the appended claims.

What is claimed is:

1. A transporter for patient's emergency escape, comprising:

a transporter main body including a main body frame structure;

a pair of crawler devices disposed on opposite sides of the transporter main body, each crawler device having a ground contacting surface extending for at least two steps of a stairway;

a load-carrying frame structure provided above the transporter main body, said load-carrying frame structure being adapted to serve as a chair for carrying a person;

a pair of tandem wheel structures each having a pair of ground contacting wheels arranged in the longitudinal direction of the transporter main body, said pair of tandem wheel structures being provided on opposite sides of the transporter main body near the rear ends of the crawler devices;

a single tandem wheel structure having a pair of ground contacting wheels arranged in the longitudinal direction of the transporter main body, said single tandem wheel structure bing provided on the bottom of the transporter main body at a substantially central position thereof;

a stand structure provided on the rear end of the transporter main body, said stand structure being pivotable such that when the stand structure is in its vertical position the transporter main body will be slightly raised up causing all the ground contacting wheels to be raised up from ground surface, and when the stand structure is in its inclined position all the ground contacting wheels may become in contact with ground surface so that the transporter itself may begin to move.

2. The transporter according to claim 1, wherein each of the pair of tandem wheel structures is constructed such that the two ground contacting wheels are rotatably supported on opposite ends of a supporting plate which itself is pivotally supported at the middle portion thereof on a frame member of the transporter main body.

3. The transporter according to claim 1, wherein each of the pair of tandem wheel structures is installed such that the two ground contacting wheels may project downwardly beyond the ground contacting surface of each crawler device and are able to be alternatively raised up and lowered down.

4. The transporter according to claim 1, wherein the single tandem wheel structure is constructed such that the two ground contacting wheels are rotatably supported on two supporting members pivotable in the longitudinal direction of the transporter main body.

5. The transporter according to claim 1, wherein the single tandem wheel structures is installed such that the two ground contacting wheels may project downwardly beyond the ground contacting surface of each crawler device and are able to be alternatively raised up and lowered down.

6. The transporter according to claim 1, wherein said single tandem wheel structure is disposed between the two crawler devices near the gravity center of the transporter.

7. The transporter according to claim 1, wherein one of the crawler devices is further provided with a braking system adapted to effect a braking action on the crawler device by not gripping a brake lever and to release the braking action by gripping the brake lever.

8. The transporter according to claim 1, wherein an oil damper is provided close to the front end of the transporter main body to control undesirably accelerated transporter moving downstairs, thereby preventing too fast and dangerous downward movement of the transporter when being used in an emergency escape.

9. The transporter according to claim 8, wherein the oil damper includes a cylindrical main body and an extending/retracting rod receivable into the cylindrical main body, with the cylindrical main body pivotally mounted at an end thereof on the transporter main body, and with the front end of the extending/retracting rod operatively connected with a pair of shafts supporting a pair of crawler wheels of the two crawler devices.

10. The transporter according to claim 1, wherein the stand structure is formed as having an L-shape in its cross section.

11. A transporter for patient's emergency escape, comprising:

a transporter main body including a main body frame structure;

a pair of crawler devices disposed on opposite sides of the transporter main body, each crawler device having a ground contacting surface extending for at least two steps of a stairway;

a load-carrying frame structure provided above the transporter main body, said load-carrying frame structure being adapted to serve as a chair for carrying a person;

a pair of tandem wheel structures each having a large front wheel and a small rear wheel arranged in the longitudinal direction of the transporter main body, said pair of tandem wheel structures being provided on opposite sides of the transporter main body near the rear ends of the crawler devices;

wherein the pair of tandem wheel structures are constructed such that the large front wheel and the small rear wheel may be alternatively raised up or lowered down when the transporter is moving down a stairway, whilst the large front wheel and the small rear wheel will get in touch with ground surface when the transporter is moving on a horizontal ground surface.

12. The transporter according to claim 11, wherein a stand structure is provided on the rear end of the transporter main body, said stand structure being pivotable such that when the stand structure is in its vertical position the transporter main body will be slightly raised up causing all the large front wheels and small rear wheels to be raised up from ground surface, and when the stand structure is in its inclined position all the large front wheels and small rear wheels may become in contact with ground surface so that the transporter itself may begin to move.

13. The transporter according to claim 12, wherein the stand structure is formed as having an L-shape in its cross section.

14. The transporter according to claim 11, wherein each of the pair of tandem wheel structures is constructed such that the large front wheel and the small rear wheel are rotatably supported on opposite ends of a supporting plate which itself is pivotally supported at the middle portion thereof on a frame member of the transporter main body.

15. The transporter according to claim 11, wherein each of the pair of tandem wheel structures is installed such that the large front wheel and the small rear wheel may project downwardly beyond the ground contacting surface of each crawler device and are able to be alternatively raised up and lowered down.

16. The transporter according to claim 11, wherein the large front wheel has a diameter which is 1.2–1.5 times as large as that of the small rear wheel.

17. The transporter according to claim 11, wherein one of the crawler devices is further provided with a braking system adapted to effect a braking action on the crawler device by not gripping a brake lever and to release the braking action by gripping the brake lever.

18. The transporter according to claim 11, wherein an oil damper is provided close to the front end of the transporter main body to control undesirably accelerated transporter moving downstairs, thereby preventing too fast and dangerous downward movement of the transporter when being used in an emergency escape.

19. The transporter according to claim 18, wherein the oil damper includes a cylindrical main body and an extending/retracting rod receivable into the main body, with the cylindrical main body pivotally mounted at an end thereof on the transporter main body, and with the front end of the extending/retracting rod operatively connected with a pair of shafts supporting a pair of crawler wheels of the two crawler devices.

* * * * *

UNITED STATES PATENT AND TRADEMARK OFFICE
CERTIFICATE OF CORRECTION

PATENT NO.   : 5,797,606

DATED        : August 25, 1998

INVENTOR(S)  : Misawa

It is certified that error appears in the above-identified patent and that said Letters Patent is hereby corrected as shown below:

```
On the title page
Item [30], insert therefor --

Jan. 23, 1996 [JP] Japan    8-9641
     Oct. 11, 1996 [JP] Japan    8-269604
     Jan. 23, 1996 [JP] Japan    8-9640   --
```

Signed and Sealed this

Tenth Day of November 1998

Attest:

BRUCE LEHMAN

Attesting Officer   Commissioner of Patents and Trademarks